(12) United States Patent
Seok et al.

(10) Patent No.: US 10,038,531 B2
(45) Date of Patent: *Jul. 31, 2018

(54) METHOD OF CHANNEL ACCESS IN WIRELESS LOCAL AREA NETWORK AND APPARATUS FOR THE SAME

(71) Applicant: LG ELECTRONICS INC., Seoul (KR)

(72) Inventors: Yong Ho Seok, Anyang-si (KR); Jong Hyun Park, Anyang-si (KR); Eun Sun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,942

(22) Filed: Oct. 5, 2016

(65) Prior Publication Data
US 2017/0026155 A1 Jan. 26, 2017

Related U.S. Application Data

(63) Continuation of application No. 14/237,111, filed as application No. PCT/KR2012/006254 on Aug. 7, 2012, now Pat. No. 9,491,779.
(Continued)

(51) Int. Cl.
H04W 72/04 (2009.01)
H04L 5/00 (2006.01)
(Continued)

(52) U.S. Cl.
CPC .......... *H04L 5/0048* (2013.01); *H04L 1/0008* (2013.01); *H04L 5/0044* (2013.01);
(Continued)

(58) Field of Classification Search
CPC ... H04L 27/2613; H04L 69/18; H04L 1/0003; H04L 1/0009; H04L 1/0025;
(Continued)

(56) References Cited

U.S. PATENT DOCUMENTS 8,363,613 B2 * 1/2013 Muppalla .............. H04L 1/0007
370/329
8,582,485 B2 * 11/2013 Fischer ................. H04L 5/0023
370/312
(Continued)

FOREIGN PATENT DOCUMENTS

KR 10-2010-0067894 6/2010

*Primary Examiner* — Sai Aung
(74) *Attorney, Agent, or Firm* — Lee Hong Degerman Kang Waimey

(57) ABSTRACT

A method for channel access in a wireless local area network is provided. The method includes: transmitting, a plurality of Request To Send (RTS) frames over a plurality of subchannels to a receiver, each RTS frame being transmitted over each of the plurality of subchannels; receiving at least one Clear To Send (CTS) frame over at least one subchannel among the plurality of subchannels from the receiver; each CTS frame being transmitted over each of the at least one subchannel, transmitting a data unit to the receiver. The data unit includes at least one data frame. The at least one data frame is transmitted over at least one selected subchannel among the at least one subchannel, each data frame being transmitted over each selected subchannel.

12 Claims, 10 Drawing Sheets

Related U.S. Application Data

(60) Provisional application No. 61/515,970, filed on Aug. 7, 2011.

(51) Int. Cl.
    *H04W 74/08*    (2009.01)
    *H04L 1/00*     (2006.01)
    *H04W 84/12*    (2009.01)
    *H04W 28/06*    (2009.01)

(52) U.S. Cl.
    CPC ........ *H04W 74/0816* (2013.01); *H04W 28/06* (2013.01); *H04W 84/12* (2013.01)

(58) Field of Classification Search
    CPC ... H04L 1/0026; H04L 1/0693; H04L 1/1671; H04L 2025/03414; H04L 2025/03802; H04L 25/0204
    See application file for complete search history.

(56) References Cited

U.S. PATENT DOCUMENTS

| | | | |
|---|---|---|---|
| 8,989,158 B2* | 3/2015 | Seok | H04W 4/20 370/338 |
| 2006/0182017 A1* | 8/2006 | Hansen | H04B 7/02 370/208 |
| 2006/0203785 A1* | 9/2006 | Kim | H04L 1/0003 370/338 |
| 2006/0280134 A1* | 12/2006 | Kwon | H04L 29/06 370/278 |
| 2006/0280153 A1* | 12/2006 | Kwon | H04W 74/0808 370/338 |
| 2007/0081485 A1* | 4/2007 | Li | H04L 5/0094 370/328 |
| 2007/0160021 A1* | 7/2007 | Xhafa | H04W 74/04 370/338 |
| 2007/0298742 A1* | 12/2007 | Ketchum | H04B 7/0617 455/186.1 |
| 2008/0045153 A1* | 2/2008 | Surineni | H04B 7/0417 455/63.1 |
| 2009/0196372 A1* | 8/2009 | Zhang | H04B 7/0417 375/267 |
| 2011/0110351 A1* | 5/2011 | Seok | H04W 4/20 370/338 |
| 2011/0205968 A1* | 8/2011 | Kim | H04W 72/085 370/328 |
| 2012/0327915 A1* | 12/2012 | Kang | H04L 5/0007 370/336 |

* cited by examiner

FIG. 7

| DYN_BANDWIDTH_IN_NON_HT | First 7 bits of Scrambling Sequence | | | |
|---|---|---|---|---|
| Not present | 5bit pseudo-random nonzero integer if CH_BANDWIDTH_HT equals NON_HT_CBW20 and a 5bit pseudo-random integer otherwise | | | 0 (NON_HT_CBW20), 1 (NON_HT_CBW40), 2 (NON_HT_CBW80), 3 (NON_HT_CBW160/ NON_HT_CBW80+80 |
| Present | Rsvd (3 bits) | Null Padding Indication (1bit) | 0 (Static) 1 (Dynamic) | |
| | B0  B1  B2 | B3 | B4 | B5  B6 |

METHOD OF CHANNEL ACCESS IN WIRELESS LOCAL AREA NETWORK AND APPARATUS FOR THE SAME

CROSS-REFERENCE TO RELATED APPLICATIONS

This application is a continuation of U.S. patent application Ser. No. 14/237,111, filed on Feb. 4, 2014, now U.S. Pat. No. 9,491,779, which is the National Stage filing under 35 U.S.C. 371 of International Application No. PCT/KR2012/006254, filed on Aug. 7, 2012, which claims the benefit of U.S. Provisional Application No. 61/515,970, filed on Aug. 7, 2011, the contents of which are all hereby incorporated by reference herein in their entirety.

FIELD OF THE INVENTION

The present invention relates to wireless communication and, more particularly, to a method of channel access performed by a station a Wireless Local Area Network (WLAN) system and an apparatus for supporting the same.

RELATED ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

Meanwhile, as the spread of a WLAN is activated, there appears an environment in which one AP provides service to a large number of non-AP stations. The characteristics of a WLAN that supporting this environment may be represented by a low data rate, low power, and wide coverage. To this end, devices operating within this WLAN environment may transmit and receive radio signals using a lower frequency band.

As a frequency of a low band is used, a channel bandwidth used to transmit and receive radio signals may become lower than the existing frequency of a high band. A change of the frequency band used to transmit and receive radio signals as described above requires a discussion on a new channel access method by a wireless apparatus.

SUMMARY OF THE INVENTION

An object of the present invention is to provide a channel access method performed by a station in a WLAN system and an apparatus for supporting the same.

In an aspect, a method for channel access, performed by a transmitter, in a wireless local area network is provided. The method includes: transmitting, a plurality of Request To Send (RTS) frames over a plurality of subchannels to a receiver, each RTS frame being transmitted over each of the plurality of subchannels; receiving at least one Clear To Send (CTS) frame over at least one subchannel among the plurality of subchannels from the receiver; each CTS frame being transmitted over each of the at least one subchannel, transmitting a data unit to the receiver. The data unit includes at least one data frame. The at least one data frame is transmitted over at least one selected subchannel among the at least one subchannel, each data frame being transmitted over each selected subchannel.

The data unit may further include at least one null data frame. The at least one null data frame may be transmitted over at least one remaining subchannel among the at least one subchannel, each null data frame being transmitted over each remaining subchannel.

The at least one CTS frame may be respectively scrambled based on each initial scrambling sequence.

The each initial scrambling sequence may include each null padding indicator. The each null padding indicator may indicate that whether a corresponding subchannel over which a corresponding CTS frame is transmitted is intended to be used for transmitting a data frame of a null data frame.

The each selected subchannel may correspond to the corresponding subchannel for transmitting the data frame indicated by the each null padding indicator.

The each remaining subchannel may correspond to the corresponding subchannel for transmitting the null data frame indicated by the each null padding indicator.

Each CTS frame may include each null data padding indicator. The each null data padding indicator may indicate that whether a corresponding subchannel over which a corresponding CTS frame is transmitted is intended to be used for transmitting a data frame of a null data frame.

The each selected subchannel may correspond to the corresponding subchannel for transmitting the data frame indicated by the each null padding indicator.

The each remaining subchannel may correspond to the corresponding subchannel for transmitting the null data frame indicated by the each null padding indicator.

A Signal to Noise Ratio (SNR) for each one selected subchannel may be greater a SNR for each remaining subchannel.

In another aspect, a wireless apparatus operating in a wireless local area network is provided. The apparatus includes transceiver configured to transmit and receive radio signals; and processor operably coupled to the transceiver. The processor is configured to: transmit a plurality of Request To Send (RTS) frames over a plurality of subchannels to a receiver, each RTS frame being transmitted over each of the plurality of subchannels; receive at least one Clear To Send (CTS) frame over at least one subchannel among the plurality of subchannels from the receiver; each CTS frame being transmitted over each of the at least one subchannel, and transmit a data unit to the receiver. The data unit includes at least one data frame, and the at least one data frame is transmitted over at least one selected subchannel among the at least one subchannel, each data frame being transmitted over each selected subchannel.

An embodiment of the present invention provides a channel access method based on a condition that channel characteristics suddenly change in each frequency in a WLAN system using a narrow frequency band and a method of transmitting and receiving a data frame according to the channel access method. A subchannel suitable for the transmission of a data frame may be signalized through the exchange of an RTS and a CTS between a transmitter and a receiver. The suitable subchannel may be determined depending on whether the Signal to Noise Ratio (SNR) of the suitable subchannel is better than that of other subchannels. The transmitter uses the signalized subchannel for the transmission of the data frame and uses the remaining subchannels for the transmission of null data frames. Accordingly, in an environment in which a variation between channel characteristics is great in each frequency, a subchannel suitable for data transmission may be selected and data may be transmitted and received through the selected subchannel. Consequently, reliability of the transmission and reception of data can be improved, and the throughput of a WLAN system can be generally improved.

BRIEF DESCRIPTION OF THE DRAWINGS

FIG. 7 is a diagram illustrating the setting of an initial scrambling sequence for signaling for the frequency selective channel access mechanism in accordance with an embodiment of the present invention.

DESCRIPTION OF EXEMPLARY EMBODIMENTS

Figure 1:
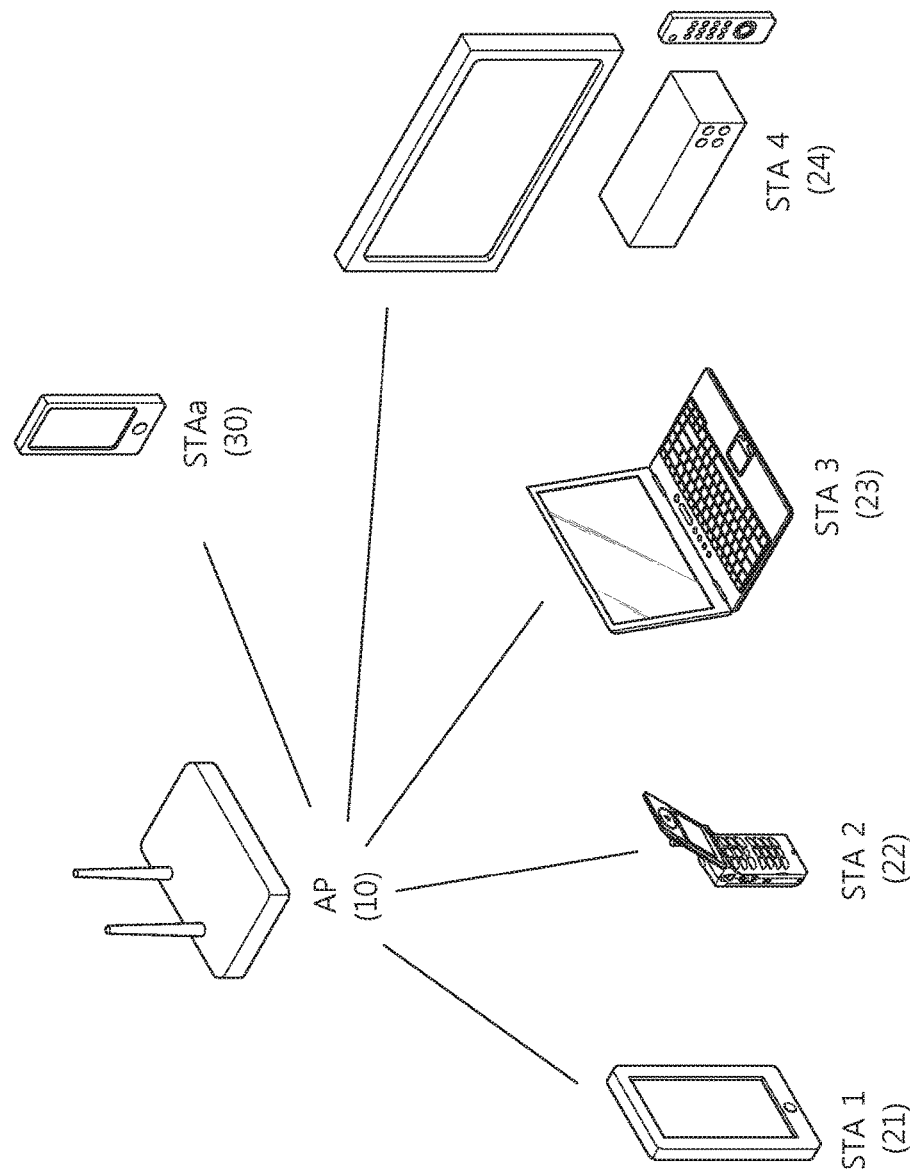
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

An IEEE 802.11 MAC protocol, together with a DCF, provides a Hybrid Coordination Function (HCF) based on a Point Coordination Function (PCF) in which a reception AP or a reception STA or both periodically poll a data frame using the DCF and a polling-based synchronous access scheme. The HCF includes Enhanced Distributed Channel Access (EDCA) in which a provider uses an access scheme for providing a data frame to a number of users as a contention-based scheme and HCF Controlled Channel Access (HCCA) employing a non-contention-based channel access scheme employing a polling mechanism. The HCF includes a medium access mechanism for improving the Quality of Service (QoS) of a WLAN and can transmit QoS data both in a Contention Period (CP) and a Contention-Free Period (CFP).

In a wireless communication system, an STA cannot know the existence of a network immediately when the STA is turned on and the STA starts operating from a viewpoint of a wireless medium. Accordingly, any type of an STA should perform a network discovery process in order to access a network. The STA that has discovered networks through the network discovery process selects a network to be joined through a network selection process. Next, the STA joins the selected network and performs a data exchange operation performed in a transmission terminal/reception terminal.

In a WLAN system, a network discovery process is embodied by a scanning procedure. The scanning procedure is divided into passive scanning and active scanning. Passive scanning is performed based on a beacon frame that is periodically broadcasted by an AP. In general, in a WLAN, an AP broadcasts a beacon frame at a specific interval (e.g., 100 msec). The beacon frame includes information about a BSS managed by the beacon frame. An STA waits passively in order to receive the beacon frame in a specific channel. The STA obtains information about a network from the received beacon frame and then terminates the scanning procedure in the specific channel. Passive scanning is advantageous in that overall overhead is small because the passive scanning is performed if an STA has only to receive a beacon frame without a need to transmit an additional frame, but is disadvantageous in that the time taken to perform scanning is increased in proportion to the transmission period of a beacon frame.

In contract, in active scanning, an STA broadcasts a probe request frame actively in a specific channel and requests information about networks from all APs that have received the probe request frame. An AP that has received the probe request frame waists for a random time in order to prevent a collision between frames and transmits a probe response frame, including information about a network, to the STA. The STA receives the probe response frame, obtains the information about networks from the probe response frame, and then terminates the scanning procedure. Active scanning is advantageous in that scanning can be finished within a relatively short time, but is disadvantageous in that overall network overhead is increased because a frame sequence according to a request and a response is necessary.

The STA that has finished the scanning procedure selects a network according to its specific criterion and then, together with the AP, performs an authentication procedure. The authentication procedure is performed according to a 2-way handshake. The STA that has finished the authentication procedure, together with the AP, performs an association procedure.

The association procedure is performed according to a 2-way handshake. First, the STA transmits an association request frame to the AP. The association request frame includes information about the capabilities of the STA. The AP determines whether or not to permit association with the STA based on the information about the capabilities. The AP that has determined whether or not to permit association with the STA transmits an association response frame to the STA. The association response frame includes information indicating whether association has been permitted or not and information indicating a reason when association is permitted or failed. The association response frame further includes information about capabilities supportable by the AP. If the association is successfully completed, frames are normally exchanged between the AP and the STA. If the association is failed, the association procedure is attempted again based on information about a failure reason included in the association response frame or the STA may request association from another AP.

In order to overcome a limit to the communication speed that was considered as being weakness in a WLAN, IEEE 802.11n has been recently established as a technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver.

As a WLAN is actively propagated and applications employing the WLAN are diversified, there is a need for a new WLAN system that supports a throughput higher than the data processing speed supported by IEEE 802.11n. The next-generation WLAN system that supports a Very High Throughput (VHT) is a next version of an IEEE 802.11n WLAN system and is one of IEEE 802.11 WLAN systems which have recently been newly proposed in order to support a data processing speed of 1 Gbps or higher in a MAC Service Access Point (SAP).

The next-generation WLAN system tries to support 80 MHz bandwidth transmission, contiguous 160 MHz bandwidth transmission, non-contiguous 160 MHz bandwidth transmission or higher. Furthermore, an MU-MIMO transmission method is provided for a higher throughput. The AP of the next-generation WLAN system can transmit a data frame to one or more MIMO-paired STAs at the same time.

In a WLAN system, such as that shown in FIG. 1, an AP 10 can transmit data to an STA group, including at least one of a plurality of STAs 21, 22, 23, 24, and 30 associated therewith, at the same time. In a WLAN system, such as that shown in FIG. 1, the AP 10 may transmit data to an STA group including at least one STA, from among the plurality of STAs 21, 22, 23, 24, and 30 associated therewith, at the same time. An example where the AP performs MU-MIMO transmission to the STAs is shown in FIG. 1. In a WLAN system supporting Tunneled Direct Link Setup (TDLS), Direct Link Setup (DLS), or a mesh network, however, an STA trying to send data may send a PPDU to a plurality of STAs by using the MU-MIMO transmission scheme. An example where an AP sends a PPDU to a plurality of STAs according to the MU-MIMO transmission scheme is described below.

The data respectively transmitted to each of the STAs may be transmitted through different spatial streams. The data packet transmitted by the AP 10 may be a PPDU, generated and transmitted by the physical layer of a WLAN system, or a data field included in the PPDU, and the data packet may be referred to as a frame. That is, a PPDU or a data field for SU-MIMO and/or MU-MIMO, which is included in the PPDU, may be referred as a MIMO packet. In an example of the present invention, it is assumed that a target transmission STA group MU-MIMO-paired with the AP 10 includes the STA 1 21, the STA 2 22, the STA 3 23, and the STA 4 24. Here, data may not be transmitted to a specific STA of the target transmission STA group because spatial streams are not allocated to the specific STA. Meanwhile, it is assumed that the STAa 30 is associated with the AP 10, but not included in the target transmission STA group.

When the AP transmits a PPDU to a plurality of STAs by using a MU-MIMO transmission scheme, the AP transmits the PPDU by inserting information indicating a group ID into the PPDU as control information. When the STA receives the PPDU, the STA confirms the group ID field and thus confirms whether the STA is a member STA of a transmission target STA group. If it is confirmed that the STA is the member of the transmission target STA group, the STA can determine at which position a spatial stream set to be transmitted to the STA is located among all spatial streams. Since the PPDU includes information indicating the number of spatial streams allocated to a reception STA, the STA can receive data by searching for spatial streams allocated to the STA.

Meanwhile, a TV White Space (WS) has been in the spotlight as a frequency band that may be newly used in a WLAN system. TV WS (White Space) refers to a frequency band that remains unused as analog TV broadcast evolves into digital in the U.S., and which occupies a range between 54 to 698 MHz. However, this is merely an example, and TV WS may be a band authorized for a licensed user to have priority for use. The licensed user means any user authorized to use a permitted band, and may be also referred to as 'licensed device', 'primary user', or 'incumbent user'.

APs and/or STAs which operate on the TV WS band need to provide protection functions for licensed users because the licensed users have priority in using the TV WS band. For instance, in the case that a licensed user, such as a microphone, has been already using a specific WS channel having a specified bandwidth divided from the TV WS band, the APs and/or STAs cannot use the frequency band corresponding to the WS channel to protect the licensed user. Also, when the licensed user uses a frequency band for transmission and/or reception of a current frame, the APs and/or STAs should stop using the frequency band.

Accordingly, the APs and/or STAs first perform a process to figure out whether a specified frequency band in the TV WS band can be used—i.e., whether there is any licensed user for the frequency band. Such process is referred to as 'spectrum sensing.' As mechanisms for spectrum sensing, energy detection or signature detection are used. When the strength of a received signal is not less than a predetermined value or when a DTV preamble is detected, it is determined that the frequency band is used by a licensed user.

Figure 2:
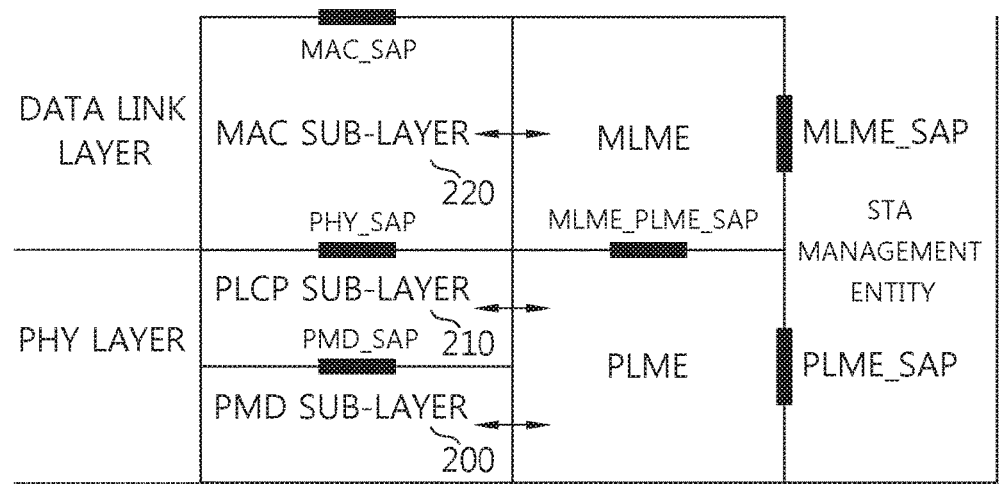
FIG. 2 shows a physical layer architecture of a WLAN system supported by IEEE 802.11.

FIG. 2 shows a physical layer architecture of a WLAN system supported by IEEE 802.11.

The IEEE 802.11 PHY architecture includes a PHY layer management entity (PLME), a physical layer convergence procedure (PLCP) sub-layer 210, and a physical medium dependent (PMD) sub-layer 200. The PLME provides a PHY management function in cooperation with a MAC layer management entity (MLME). The PLCP sub-layer 210 located between a MAC sub-layer 220 and the PMD sub-layer 200 delivers to the PMD sub-layer 200 a MAC protocol data unit (MPDU) received from the MAC sub-layer 220 under the instruction of the MAC layer, or delivers to the MAC sub-layer 220 a frame received from the PMD sub-layer 200. The PMD sub-layer 200 is a lower layer of the PDCP sub-layer and serves to enable transmission and reception of a PHY entity between two STAs through a radio medium. The MPDU delivered by the MAC sub-layer 220 is referred to as a physical service data unit (PSDU) in the PLCP sub-layer 210. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 210 attaches an additional field including information required by a PHY transceiver in a process of receiving the PSDU from the MAC sub-layer 220 and delivering the PSDU to the PMD sub-layer 200. The additional field attached to the PSDU in this case may be a PLCP preamble, a PLCP header, tail bits required to reset an convolution encoder to a zero state, etc. The PLCP sublayer 210 receives a TXVECTOR parameter, including control information necessary to generate and transmit a Physical Layer Convergence Procedure (PLCP) Protocol Data Unit (PPDU) and control information necessary for a receiving STA to receive and interpret the PPDU, from the MAC sublayer 220. The PLCP sublayer 210 uses the information included in the TXVECTOR parameter in order to generate the PPDU including the PSDU.

The PLCP preamble serves to allow a receiver to prepare a synchronization function and antenna diversity before the PSDU is transmitted. In the PSDU, the data field may include padding bits, a service field including a bit sequence for initializing a scrambler, and a coded sequence obtained by encoding a bit sequence to which tail bits are attached. In this case, either binary convolutional coding (BCC) encoding or low density parity check (LDPC) encoding can be selected as an encoding scheme according to an encoding scheme supported in an STA that receives a PLCP protocol data unit (PPDU). The PLCP header includes a field that contains information on a PPDU to be transmitted, which will be described below in greater detail with reference to FIGS. 3 and 4.

The PLCP sub-layer 210 generates a PPDU by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data. The PLCP sublayer of the receiving STA transfers an RXVECTOR parameter, including control information included in a PLCP preamble and a PLCP header, to an MAC sublayer so that the MAC sublayer can interpret the PPDU and obtain data in a reception state.

Figure 3:
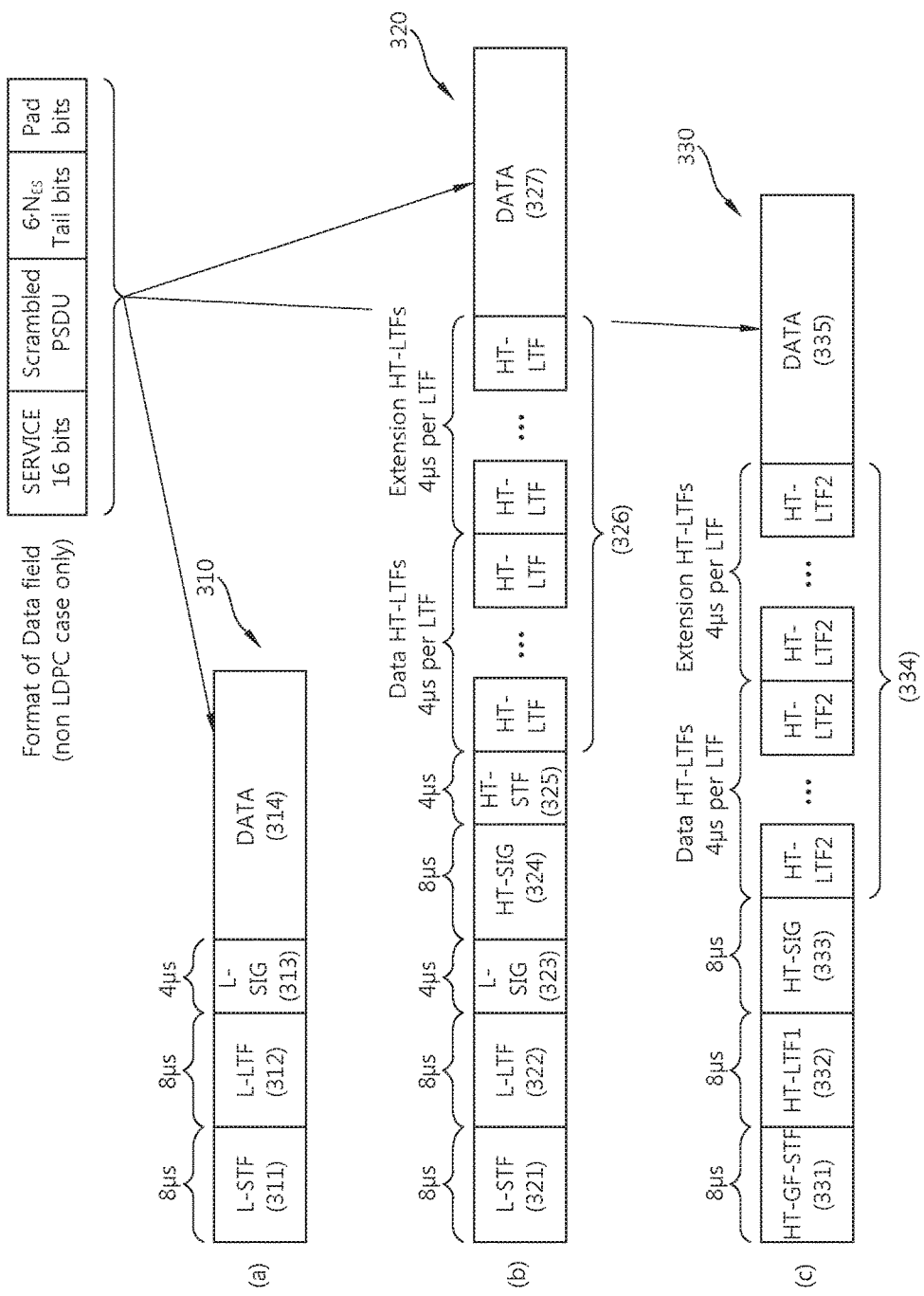
FIGS. 3 and 4 are block diagrams showing the formats of PPDUs used in a WLAN system to which an embodiment of the present invention may be applied.
Figure 4:
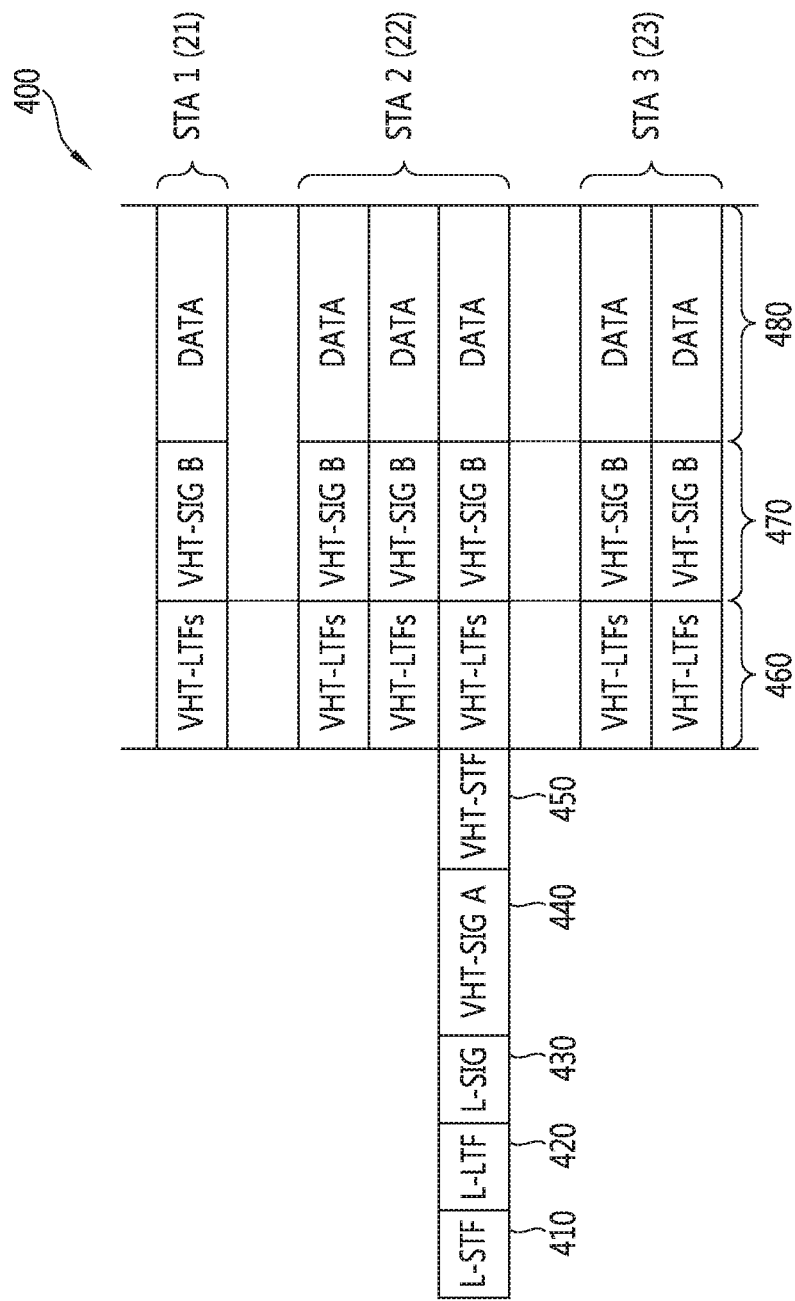

FIGS. 3 and 4 are block diagrams showing the formats of PPDUs used in a WLAN system to which an embodiment of the present invention may be applied. An STA that is operated in a legacy WLAN system based on IEEE 802.11a/b/g, that is, the existing WLAN standards before the IEEE 802.11n standard, is called a Legacy STA (L-STA). Furthermore, an STA capable of supporting an HT in an HT WLAN system based on the IEEE 802.11n standard is called an HT-STA.

(a) of FIG. 3 shows the format of a Legacy PPDU (L-PPDU) that was used in IEEE 802.11a/b/g, that is, the existing WLAN system standards before the IEEE 802.11n standard. Accordingly, in an HT WLAN system to which the IEEE 802.11n standard is applied, an L-STA can transmit and receive an L-PPDU having the format shown in (a) of FIG. 3.

Referring to FIG. 3(a), an L-PPDU 310 includes an L-STF field 311, an L-LTF field 312, an L-SIG field 313, and a data field 314.

The L-STF field 311 is used for frame timing acquisition, automatic gain control (AGC) convergence, coarse frequency acquisition, etc.

The L-LTF field 312 is used for frequency offset and channel estimation.

The L-SIG field 313 includes control information for demodulation and decoding of the data field 314.

The L-PPDU may be transmitted in the order of the L-STF field 311, the L-LTF field 312, the L-SIG field 313, and the data field 314.

FIG. 3(b) is a diagram showing an HT-mixed PPDU format in which an L-STA and an HT-STA can coexist. An HT-mixed PPDU 320 includes an L-STF field 321, an L-LTF field 322, an L-SIG field 323, an HT-SIG field 324, an HT-STF field 325, a plurality of HT-LTF fields 326, and a data field 327.

The L-STF field 321, the L-LTF field 322, and the L-SIG field 323 are identical to those shown in FIG. 3(a). Therefore, the L-STA can interpret the data field by using the L-STF field 321, the L-LTF field 322, and the L-SIG field 323 even if the HT-mixed PPDU 320 is received. The L-LTF field 322 may further include information for channel estimation to be performed by the HT-STA in order to receive the HT-mixed PPDU 320 and to interpret the L-SIG field 323, the HT-SIG field 324, and the HT-STF field 325.

The HT-STA can know that the HT-mixed PPDU 320 is a PPDU dedicated to the HT-STA by using the HT-SIG field 324 located next to the L-SIG field 323, and thus can demodulate and decode the data field 327.

The HT-STF field 325 may be used for frame timing synchronization, AGC convergence, etc., for the HT-STA.

The HT-LTF field 326 may be used for channel estimation for demodulation of the data field 327. Since the IEEE 802.11n supports single user-MIMO (SU-MIMO), a plurality of the HT-LTF fields 326 may be configured for channel estimation for each of data fields transmitted through a plurality of spatial streams.

The HT-LTF field 326 may consist of a data HT-LTF used for channel estimation for a spatial stream and an extension HT-LTF additionally used for full channel sounding. Therefore, the number of the plurality of HT-LTF fields 326 may be equal to or greater than the number of spatial streams to be transmitted.

The L-STF field 321, the L-LTF field 322, and the L-SIG field 323 are transmitted first so that the L-STA also can acquire data by receiving the HT-mixed PPDU 320. Thereafter, the HT-SIG field 324 is transmitted for demodulation and decoding of data transmitted for the HT-STA.

Up to fields located before the HT-SIG field 324, transmission is performed without beamforming so that the L-STA and the HT-STA can acquire data by receiving a corresponding PPDU. In the subsequently fields, i.e., the HT-STF field 325, the HT-LTF 326, and the data field 327, radio signal transmission is performed by using precoding. In this case, the HT-STF field 325 is transmitted so that an STA that receives a precoded signal can consider a varying part caused by the precoding, and thereafter the plurality of HT-LTF fields 426 and the data field 327 are transmitted.

Even if an HT-STA that uses 20 MHz in an HT WLAN system uses 52 data subcarriers per OFDM symbol, an L-STA that also uses 20 MHz uses 48 data subcarriers per OFDM symbol. Since the HT-SIG field 324 is decoded by using the L-LTF field 322 in a format of the HT-mixed PPDU 320 to support backward compatibility, the HT-SIG field 324 consists of 48*2 data subcarriers. The HT-STF field 325 and the HT-LTF 326 consist of 52 data subcarriers per OFDM symbol. As a result, the HT-SIG field 324 is supported using ½ binary phase shift keying (BPSK), each HT-SIG field 324 consists of 24 bits, and thus 48 bits are transmitted in total. That is, channel estimation for the L-SIG field 323 and the HT-SIG field 324 is performed using the L-LTF field 322, and a bit sequence constituting the L-LTF field 322 can be expressed by Equation 1 below. The L-LTF field 322 consists of 48 data subcarriers per one symbol, except for a DC subcarrier.

$$L_{-26,26} = \{1,1,-1,-1,1,1,-1,1,-1,1,1,1,1,1,1,-1,-1,1,1,\\ 1,-1,1,-1,1,1,1,1,0,1,-1,-1,1,1,-1,1,-1,1,-1,\\ -1,-1,-1,-1,1,1,1,-1,-1,1,1,-1,1,-1,1,1,1,1,1\} \quad \text{[Math Figure 1]}$$

FIG. 3(c) is a diagram showing a format of an HT-Greenfield PPDU 330 that can be used by only an HT-STA. The HT-GF PPDU 330 includes an HT-GF-STF field 331, an HT-LTF1 field 332, an HT-SIG field 333, a plurality of HT-LTF2 fields 334, and a data field 335.

The HT-GF-STF field 331 is used for frame timing acquisition and AGC.

The HT-LTF1 field 332 is used for channel estimation.

The HT-SIG field 333 is used for demodulation and decoding of the data field 335.

The HT-LTF2 334 is used for channel estimation for demodulation of the data field 335. Since the HT-STA uses SU-MIMO, channel estimation is required for each of data fields transmitted through a plurality of spatial streams, and thus a plurality of HT-LTF2 fields 334 may be configured.

The plurality of HT-LTF2 fields 334 may consist of a plurality of data HT-LTFs and a plurality of extension HT-LTFs, similarly to the HT-LTF 326 of the HT-mixed PPDU 320.

Each of the data fields 314, 327, and 335 respectively shown in FIGS. 3(a), (b), and (c) may include a service field, a scrambled PSDU field, a tail bits field, and a padding bits field. The service field may be used to reset a scrambler. The service field may be set to 16 bits. In this case, bits for resetting the scrambler may be 7 bits. A tail field may include a bit sequence necessary to return a convolution encoder to a state 0. The tail field may be assigned a bit size that is proportional to the number of Binary Convolutional Code (BCC) encoders used to encode data to be transmitted. More particularly, the tail field may be embodied so that it has 6 bits per BCC.

FIG. 4 shows an example of a PPDU format used in a WLAN system.

Referring to FIG. 4, a PPDU 400 includes an L-STF field 410, an L-LTF field 420, an L-SIG field 430, a VHT-SIGA field 440, a VHT-STF field 450, a VHT-LTF field 460, a VHT-SIGB field 470, and a data field 480.

A PLCP sub-layer constituting a PHY converts a PSDU delivered from a MAC layer into the data field 480 by appending necessary information to the PSDU, generates the PPDU 400 by appending several fields such as the L-STF field 410, the L-LTF field 420, the L-SIG field 430, the VHT-SIGA field 440, the VHT-STF field 450, the VHT-LTF field 460, the VHT-SIGB field 470, or the like, to the data field and delivers the PPDU 400 to one or more STAs through a physical medium dependent (PMD) sub-layer constituting the PHY. Control information required by the PLCP sub-layer to generate the PPDU and control information used by a reception STA to interpret the PPDU and transmitted by being included in the PPDU are provided from a TXVECTOR parameter delivered from the MAC layer.

The L-SFT 410 is used for frame timing acquisition, automatic gain control (AGC) convergence, coarse frequency acquisition, etc.

The L-LTF field 420 is used for channel estimation for demodulation of the L-SIG field 430 and the VHT-SIGA field 440.

The L-SIG field 430 is used when the L-STA receives the PPDU 400 and interprets it to acquire data. The L-SIG field 430 includes a rate sub-field, a length sub-field, a parity bit and tail field. The rate sub-field is set to a value indicating a bit state for data to be currently transmitted.

The length sub-field is set to a value indicating an octet length of a PSDU to be transmitted by the PHY layer at the request of the MAC layer. In this case, an L_LENGTH parameter which is a parameter related to information indicating the octet length of the PSDU is determined based on a TXTIME parameter which is a parameter related to a transmission time. TXTIME indicates a transmission time determined for PPDU transmission including the PSDU by the PHY layer in association with a transmission time requested for transmission of the PSDU. Therefore, since the L_LENGTH parameter is a time-related parameter, the length sub-field included in the L-SIG field 530 includes information related to the transmission time.

The VHT-SIGA field 440 includes control information (or signal information) required by STAs for receiving the PPDU to interpret the PPDU 400. The VHT-SIGA 440 is transmitted on two OFDM symbols. Accordingly, the VHT-SIGA field 440 can be divided into a VHT-SIGA1 field and a VHT-SIGA2 field. The VHT-SIGA1 field includes channel bandwidth information used for PPDU transmission, identifier information related to whether space time block coding (STBC) is used, information indicating either SU or MU-MIMO as a PPDU transmission scheme, and, if the transmission scheme is MU-MIMO, information indicating a transmission target STA group of a plurality of STAs which are MU-MIMO paired with the AP, and information regarding a spatial stream allocated to each STA included in the transmission target STA group. The VHT-SIGA2 field includes information related to a short guard interval (GI).

The information indicating the MIMO transmission scheme and the information indicating the transmission target STA group can be implemented as one piece of MIMO indication information, and for example, can be implemented as a group ID. The group ID can be set to a value having a specific range. A specific value in the range indicates an SU-MIMO transmission scheme, and other values can be used as an identifier for a corresponding transmission target STA group when the MU-MIMO transmission scheme is used to transmit the PPDU 400.

When the group ID indicates that the PPDU 400 is transmitted using the SU-MIMO transmission scheme, the VHT-SIGA2 field includes coding indication information indicating whether a coding scheme applied to the data field is binary convolution coding (BCC) or low density parity check (LDPC) coding and modulation coding scheme (MCS) information regarding a channel between a transmitter and a receiver. In addition, the VHT-SIGA2 field can include an AID of a transmission target STA of the PPDU and/or a partial AID including a part of bit-sequence of the AID.

When the group ID indicates that the PPDU 400 is transmitted using the MU-MIMO transmission scheme, the VHT-SIGA field 400 includes coding indication information indicating whether a coding scheme applied to the data field which is intended to be transmitted to MU-MIMO paired reception STAs is BCC or LDPC coding. In this case, MCS information for each reception STA can be included in the VHT-SIGB field 470.

The VHT-STF 450 is used to improve performance of AGC estimation in MIMO transmission.

The VHT-LTF 460 is used when the STA estimates a MIMO channel. Since the next generation WLAN system supports MU-MIMO, the VHT-LTF field 460 can be configured by the number of spatial streams in which the PPDU 400 is transmitted. In addition, when full channel sounding is supported and is performed, the number of VHT-LTFs may increase.

The VHT-SIGB field 470 includes dedicated control information required when the plurality of MIMO-paired STAs receive the PPDU 400 to acquire data. Therefore, the STA may be designed such that the VHT-SIGB field 470 is decoded only when the control information included in the VHT-SIGA field 440 indicates that the currently received PPDU 400 is transmitted using MU-MIMO transmission. On the contrary, the STA may be designed such that the VHT-SIGB field 470 is not decoded when the control information in the VHT-SIGA field 440 indicates that the currently received PPDU 400 is for a single STA (including SU-MIMO).

The VHT-SIGB field 470 may include MCS information and rate-matching information for each STA. Further, the VHT-SIGB field 470 may include information indicating a PSDU length included in the data field for each STA. The information indicating the PSDU length is information indicating a length of a bit-sequence of the PSDU and can be indicated in the unit of octet. Meanwhile, when the PPDU is transmitted based on single user transmission, the information about the MCS may not be included in the VHT-SIGB field 470, because that is included in the VHT-SIGA field 440. A size of the VHT-SIGB field 470 may differ according to the MIMO transmission method (MU-MIMO or SU-MIMO) and a channel bandwidth used for PPDU transmission.

The data field 480 includes data intended to be transmitted to the STA. The data field 480 includes a service field for initializing a scrambler and a PLCP service data unit (PSDU) to which a MAC protocol data unit (MPDU) of a MAC layer is delivered, a tail field including a bit sequence required to reset a convolution encoder to a zero state, and padding bits for normalizing a length of the data field. In case of MU transmission, each data unit intended to be respectively transmitted to each STA may be included in the data field 480. The data unit may be aggregate MPDU (A-MPDU).

In the WLAN system of FIG. 1, if the AP 10 intends to transmit data to the STA1 21, the STA2 22, and the STA3 23, then a PPDU may be transmitted to an STA group including the STA1 21, the STA2 22, the STA3 23, and the STA4 24. In this case, as shown in FIG. 4, no spatial stream may be allocated to the STA4 24, and a specific number of spatial streams may be allocated to each of the STA1 21, the STA2 22, and the STA3 23 and thus data can be transmitted. In the example of FIG. 4, one spatial stream is allocated to the STA1 21, three spatial streams are allocated to the STA2 22, and two spatial streams are allocated to the STA3 23.

Meanwhile, with the recent advent of various communication services, such as smart grid, e-Health, and ubiquitous, Machine to Machine (M2M) technology for supporting the various communication services has been in the spotlight. Each of a sensor for detecting temperature or humidity, a camera, home appliances, such as TV, a process machine in a factory, and a large machine, such as a vehicle, may become one of elements that form an M2M system. Elements forming the M2M system may transmit and receive data based on WLAN communication. A case where elements forming an M2M system support a WLAN and configure a network is hereinafter called an M2M WLAN system.

A WLAN system supporting M2M has the following characteristics.

1) A large number of STAs: It is assumed that the M2M includes a number of STAs within a BSS, unlike in the existing network. This is because not only devices owned by a person, but also sensors, etc. installed in a home or company are taken into consideration. Accordingly, numerous STAs may be connected to one AP.

2) A low traffic load per STA: In an M2M system, an STA does not need to transmit information frequently and the amount of the information is relatively small because the STA has a traffic pattern that pieces of surrounding information are gathered and reported.

3) Communication focused on uplink: The M2M is chiefly configured to receive a command in downlink, take action, and report resulting data in uplink. In a system supporting the M2M, uplink becomes the center because major data is commonly transmitted in uplink.

4) The power management of an STA: An M2M terminal is chiefly operated by the battery, and it is difficult for a user to charge the battery frequently. Accordingly, there is a need for a power management method of minimizing battery consumption.

5) An automatic recovery function: a device forming an M2M system needs an autonomous recovery function because it is difficult for a person to directly manipulate the device in a specific situation.

From among the characteristics of a WLAN system which supports the M2M, in particular, a communication environment in which numerous STAs are connected to an AP may becomes an embodiment to which communication methods proposed by the present invention may be effectively applied. Accordingly, in describing the embodiments of the present invention hereinafter, a WLAN system which supports the M2M is described as an example. The communication method proposed by the present invention is not limited to a WLAN system supporting the M2M, but may be applied to common WLAN systems and communication systems.

The most common server/client structure, from among the existing network models other than the M2M is described below. In most cases, a client (i.e., an STA) requests information from a server, and the server transmits relevant information (or data) to the STA. The server that provides the information may be considered as a machine which collects pieces of information mechanically and provides the collected information. The subject that has received the information becomes a user that has used the client (i.e., the STA). The characteristic of this network model corresponds to a reason why lots of communication techniques have been developed based on downlink.

In a network which supports the M2M, however, the structure is reversed. In other words, the client (i.e., the STA), that is, the machine, functions to collect pieces of information and provide the information. In contrast, a user that manages the server requests the information. That is, in an M2M WLAN system, a network model in which a server issues a command, such as the measurement of surrounding environments, to an M2M STA, and an STA performs sensing in response to the command and reports the results of the sensing to the server is common. In other words, unlike in the existing mode, it can be seen that a user accesses a network on the server side and the direction in the flow of information is reversed. Accordingly, for effective M2M communication, the functions of the existing STA need to be reduced, and a management function in a network needs to be expanded.

From this point of view, it can be seen that network management technology has to be taken into consideration again in an M2M WLAN system. In the previous network model, the network management function is also given to an STA because a user is placed on the STA side. In the M2M system, however, it is necessary to enhance the network management function on the server side because an STA has only to provide information in response to a command.

In a WLAN system supporting the M2M, however, several thousands of STAs connected to an AP may be taken into consideration in embodying an actual system. In this case, a method in which one STA occupies the same wireless medium and performs communication at once by using the existing CSMA/CS method may have a limit to effective network management. For example, unlike in the existing 2.4 GHz or 5 GHz, if a WLAN is operated in a band of 1 GHz or less represented by 700 to 900 MHz, the same transmit power versus to the coverage of an AP may be expanded about 2 to 3 times owing to the propagation characteristic of the band. It leads to a characteristic that a larger number of STAs is connected to one AP.

A WLAN system that supports M2M and has the characteristics of a low data rate, low power, and wide coverage as described above may be suitable for service using a narrow band. This is because the bandwidth of a channel is relatively narrowed because the WLAN system uses a frequency band of a 1 GHz band or lower, unlike in a WLAN system in which radio signals are transmitted and received using a band of 2.4 GHz or 5 GHz. Accordingly, the WLAN system that supports M2M may use a channel bandwidth of 0.5 MHz, 1 MHz, or 2 MHz in order to transmit and receive radio signals.

One of the major characteristics of a narrow band channel access mechanism lies in that a channel bandwidth is very narrow unlike in the existing WLAN system. In this case, the narrow band channel access mechanism may require a different access method from the existing channel access mechanism that uses a relatively wide channel bandwidth.

It is hereinafter assumed that a transmitter that transmits a specific data frame is an AP and a receiver corresponding to the AP is an STA, but this is only illustrative. The transmitter and the receiver may be an AP and/or an STA.

Figure 5:
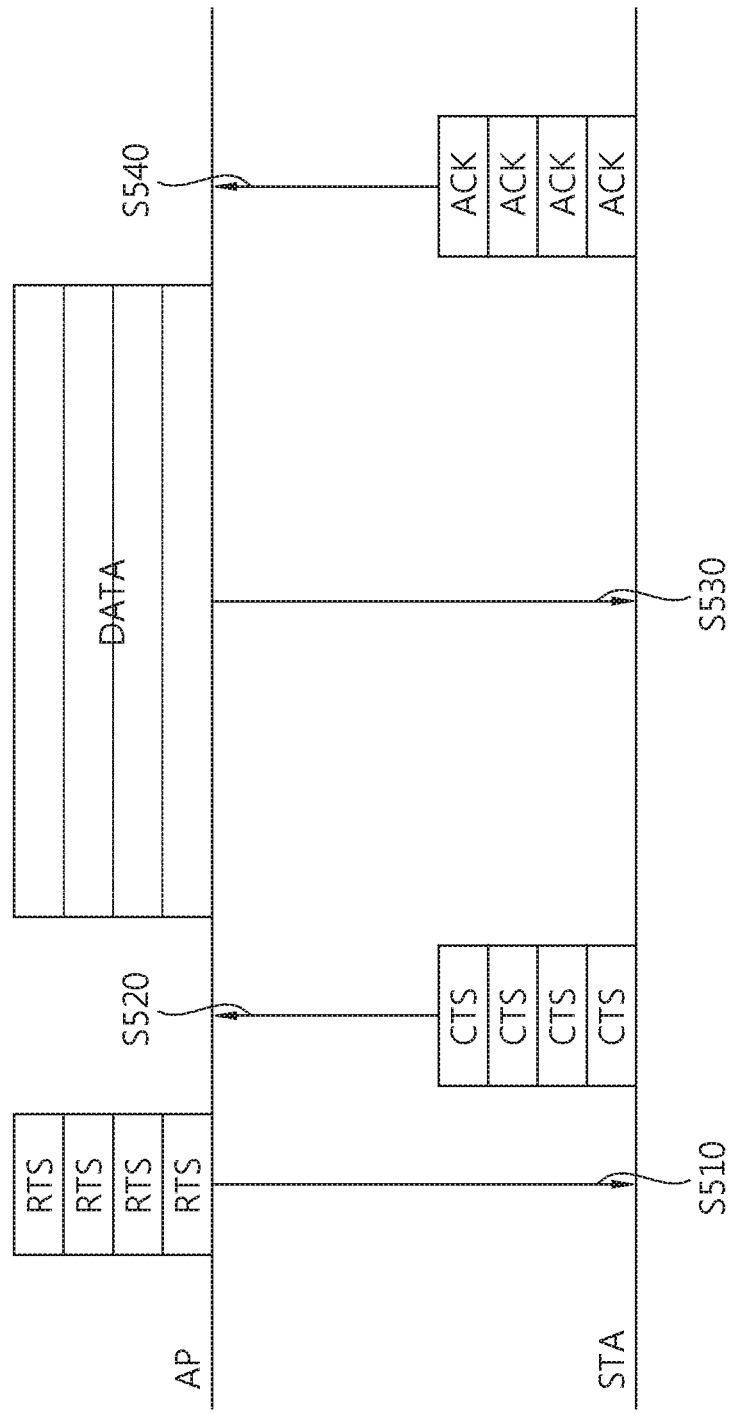
FIG. 5 is a diagram showing an example of a channel access mechanism in the existing WLAN system.

FIG. 5 is a diagram showing an example of a channel access mechanism in the existing WLAN system. In FIG. 5, it is assumed that the existing WLAN system supports wider channel bandwidths 20/40/80/160 MHz than a WLAN system that supports M2M. The channel access mechanism is described assuming that the channel bandwidth of 80 MHz is used.

Referring to FIG. 5, an AP that tries to access a channel in order to transmit data transmits RTS frames at step S510. The AP transmits the RTS frames according to the 20 MHz channel bandwidth through respective 20 MHz subchannels. In order to cover the 80 MHz channel bandwidth, the AP may transmit a total of four RTS frames in a duplicated PPDU format.

An STA transmits CTS frames each using a 20 MHz channel bandwidth as a response to subchannels through which the RTS frames have been successfully received at step S520. If the CTS frames are transmitted in relation to a plurality of subchannels, the STA may transmit a specific number of the CTS frames in a duplicated PPDU format.

When the STA successfully receives the RTS frames for all the subchannels 1 to 4 as shown in FIG. 5, the STA transmits the CTS frames of an 80 MHz duplicated format for all the subchannels 1 to 4. In contrast, when the STA successfully receives the RTS frames for the subchannels 2 and 3, the STA may transmit the CTS frames of a 40 MHz duplicated format through the subchannels 2 and 3.

The AP transmits a data frame through a channel that enables channel access through an RTS-CTS exchange at step S530. If the AP successfully receives all the CTS frames for 80 MHz channel bandwidth, that is, if the AP receives the four CTS frames through the subchannels 1 to 4, the AP may transmit the data frame of 80 MHz through the 80 MHz channel. In contrast, if the AP successfully receives the CTS frames for the subchannels 2 and 3, the AP may transmit the data frame of 40 MHz through the 40 MHz channel including the subchannels 2 and 3.

In response to the data frame received from the AP, the STA transmits Acknowledgement (ACK) frames to the AP at step S540. The ACK frames may be transmitted for the subchannels through which the data frame is transmitted and may be transmitted as the ACK frame of a duplicated format.

After receiving the 80 MHz data frame, the STA may transmit the ACK frame of the duplicated format for the 80 MHz channel to the AP. In contrast, if the data frame of 40 MHz is received through the subchannels 2 and 3, the STA may transmit the ACK frame of the duplicated format of 40 MHz through the subchannels 2 and 3.

In a WLAN system to which the channel access mechanism is applied, such as that shown in FIG. 5, one subchannel has a bandwidth of 20 MHz. In contrast, in a narrow band frequency environment in which a subchannel is 0.5 MHz, 1 MHz, or 2 MHz like in an M2M WLAN system, a frequency selective channel access mechanism may be necessary.

Figure 6:
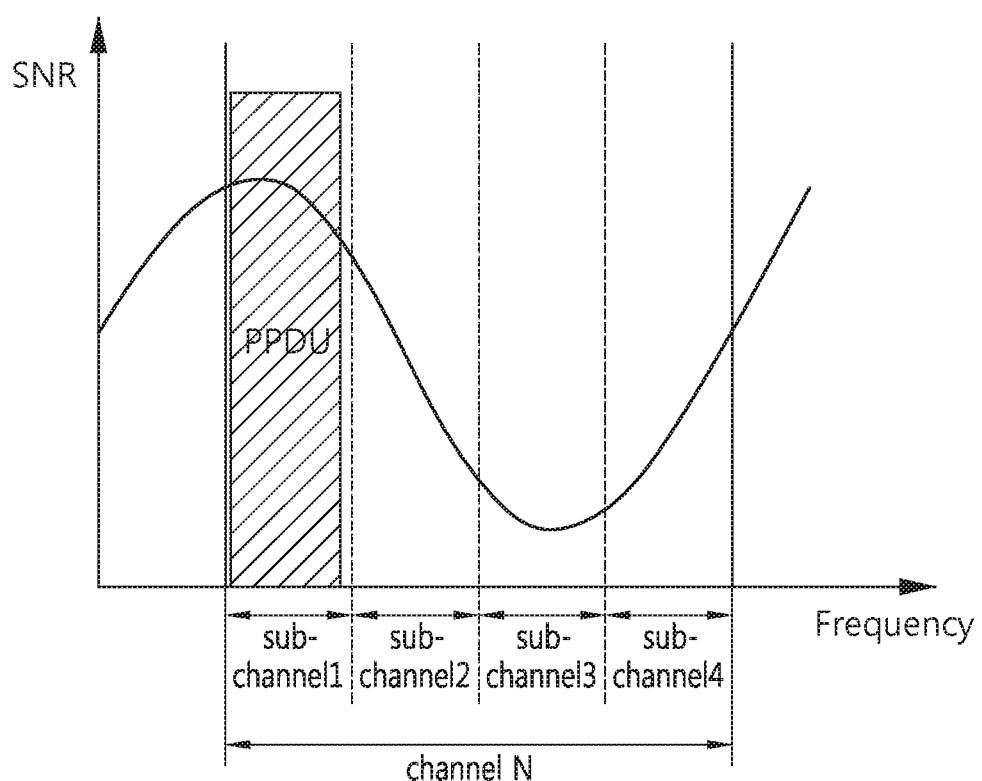
FIG. 6 is a diagram illustrating the concept of the frequency selective channel access mechanism in the narrow band frequency environment of an M2M WLAN system in accordance with an embodiment of the present invention.

FIG. 6 is a diagram illustrating the concept of the frequency selective channel access mechanism in the narrow band frequency environment of an M2M WLAN system in accordance with an embodiment of the present invention.

The frequency selective channel access mechanism means that a subchannel having the best Signal to Noise Ratio (SNR) is selected and transmitted when there is a great different in the SNR between subchannels.

Referring to FIG. 6, a channel N corresponds to a 4 MHz channel including four subchannels. It can be seen that there is a great difference in the SNR between the four subchannels. In this case, it can be seen that a PPDU is transmitted using the subchannels 1 having the highest SNR.

In order to apply the frequency selective channel access mechanism to a WLAN system environment, subchannel probing for selecting a subchannel having the highest SNR from a plurality of subchannels. Accordingly, the present invention proposes a subchannel probing method through an RTS-CTS exchange. The subchannel probing method is based on that, like the channel access method of FIG. 5, an RTS frame of a duplicated format is transmitted through each of subchannels and a subchannel having the highest SNR is signalized through a CTS frame. The subchannel probing method is described in detail below with reference to FIG. 7.

FIG. 7 is a diagram illustrating the setting of an initial scrambling sequence for signaling for the frequency selective channel access mechanism in accordance with an embodiment of the present invention.

Referring to FIG. 7, one of 7 bits that form the initial scrambling sequence of a PPDU for the transmission of a CTS frame is set as a null padding indication bit. That is, if dynamic bandwidth transmission and reception are supported (i.e., when a parameter DYN_BANDWIDTH_IN_NON_HT includes TXVECTOR), the bit allocated as the null padding indication bit, in the initial scrambling sequence, may indicate whether a subchannel through which a corresponding CTS frame is transmitted will be used to transmit a data frame or not. If the null padding indication bit is set to '1', it may be interpreted that a subchannel through which a corresponding CTS frame is transmitted is not used to transmit a data frame, but the subchannel is requested to be subject to null padding. In contrast, if the null padding indication bit is set to '0', it may be interpreted that a subchannel through which a corresponding CTS frame is transmitted is requested to be used to transmit a data frame.

The null padding of a subchannel means that any physical signal is not transmitted through a specific subchannel and a specific meaningless physical signal is transmitted through a specific subchannel. It may be considered that the redundant transmission of a data frame as a specific signal belongs to the category of the null padding.

If the SNR of a specific subchannel is low, the null padding indication bit of a CTS frame transmitted through a corresponding subchannel is set to a value '1', the CTS frame is processed, and the CTS frame is transmitted in the PPDU format. Thus, an AP receives the CTS frame and may determine whether to transmit a data frame through the corresponding subchannel based on the value set in the null padding indication bit.

More particularly, first, an STA generates a scrambling sequence by applying a predetermined generator polynomial to the initial scrambling sequence of 7 bits including a null padding indication bit set to a specific value. Here, the initial scrambling sequence may include a null padding indication bit differently set depending on a subchannel. The STA may scramble a data field, including a CTS frame to be transmitted through each subchannel, based on the generated scrambling sequence. The data field including the CTS frame transmitted through the subchannel to be use to transmit the data frame may be scrambled into the scrambling sequence generated based on an initial scrambling sequence that includes a null padding indication bit set to a value '0'. In contrast, a data field including a CTS frame transmitted through a subchannel that will be used to transmit a null data frame that has been subjected to null padding may be scrambled into a scrambling sequence generated based on the initial scrambling sequence including the null padding indication bit set to a value '1'. An STA may transmit each data field, scrambled as described above, through a PPDU of a duplicated format.

An AP receives the PPDU and may check the null padding indication bit of each initial scrambling sequence through the scrambling sequence that has been applied to the CTS frame transmitted through the subchannel. Accordingly, the AP may check a subchannel for the transmission of a data frame and a subchannel for the transmission of a null data frame.

The subchannel probing method for the frequency selective channel access mechanism may be implemented by including a CTS frame itself in signaling information. A bitmap sequence indicating the SNR level of each subchannel may be included in the CTS frame. For example, if a 2-level (low, high) SNR indication is used for four subchannels, a bitmap of a total of 4 bits may be added. If a subchannel 1 has the highest SNR, a bitmap sequence may be set to (1, 0, 0, 0) and included in the CTS frame. To indicate the high or low of a specific bit value may be implemented by another setting value.

Figure 8:
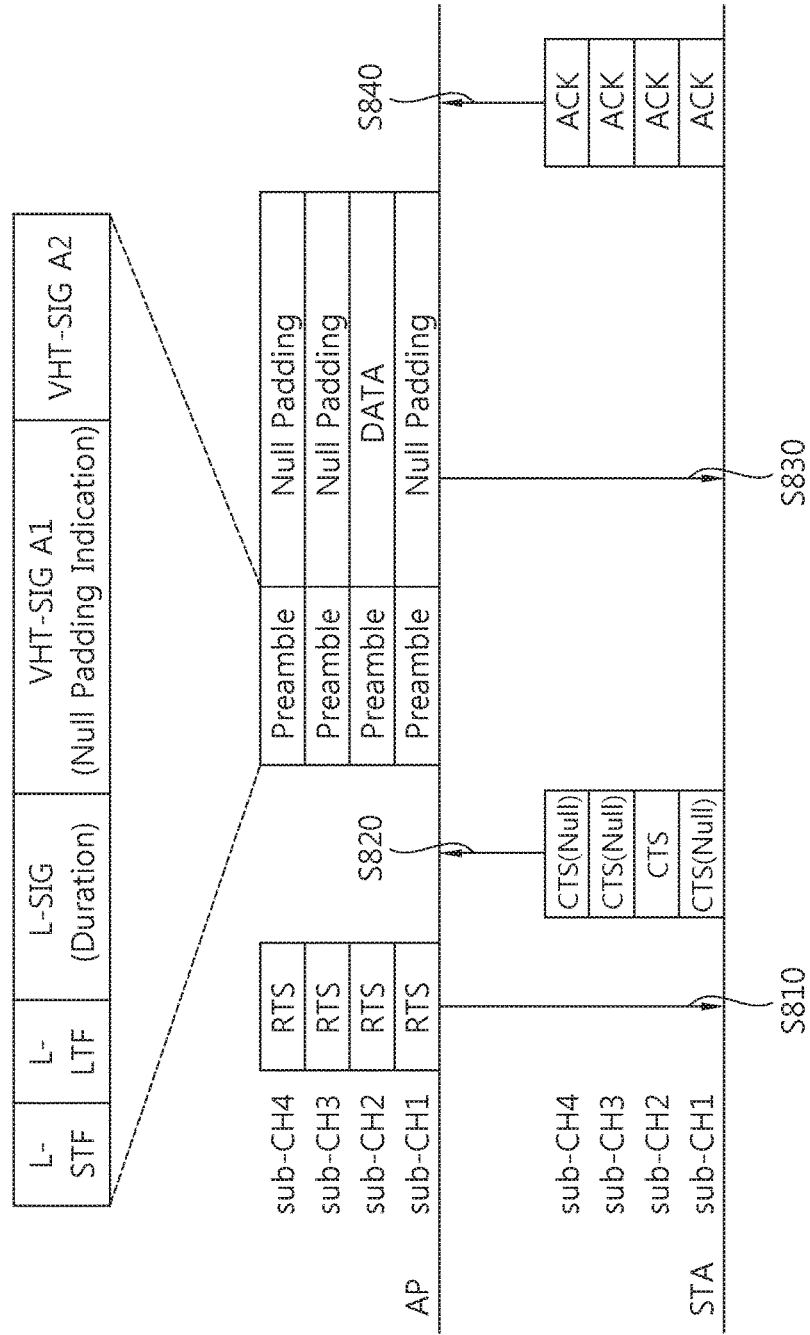
FIG. 8 is a diagram illustrating a data frame transmission method based on the frequency selective channel access mechanism in accordance with an embodiment of the present invention.

FIG. 8 is a diagram illustrating a data frame transmission method based on the frequency selective channel access mechanism in accordance with an embodiment of the present invention.

Referring to FIG. 8, an AP transmits RTS frames of a duplicated format to an STA through subchannels at step S810.

In response to the RTS frames received through the respective subchannels 1 to 4, the STA transmits CTS frames of a duplicated format to the AP at step S820.

Subchannel probing can be performed through the RTS-CTS exchange at steps S810 and S820. A channel for the transmission of a data frame may be selectively indicated by setting the null padding indication bit of an initial scrambling sequence for the transmission of the CTS frames. More particularly, the setting of the null padding indication bit may signalize that the AP performs null padding on a specific subchannel and transmits a null data frame.

In the example of FIG. 8, the subchannel 2 has the highest SNR. Accordingly, regarding the CTS frames transmitted through the subchannels 1, 3, and 4, the null padding indication bit of an initial scrambling sequence may be set to a value '1' indicating that null padding must be performed. In contrast, regarding the CTS frame transmitted through the subchannel 2, the null padding indication bit of an initial scrambling sequence may be set to a value '0'. Accordingly, the AP may be requested to transmit a data frame through the subchannel 2.

After the RTS-CTS exchange is performed, the AP transmits a PPDU including a data frame at step S830. When the AP transmits the PPDU, an indication for the subchannel through which the data frame is actually transmitted and an indication for the subchannel corresponding null padding may be implemented again. To this end, the PPDU may be transmitted in a duplicated format. That is, a PLCP preamble is transmitted through all the subchannels. The PLCP preamble may include a null padding indication bit. The null padding indication bit may be included in the VHT-SIGA1 field of the PLCP preamble.

If the data frame is transmitted through the subchannel 2 as in FIG. 8, a null padding indication bit set to a value '0' may be included in the VHT-SIGA1 field of a PLCP preamble that is transmitted through the subchannel 2 in order to indicate that the data frame is transmitted. In contrast, a null padding indication bit set to a value '1' may be included in the VHT-SIGA1 field of a PLCP preamble for the subchannels 1, 3, and 4 through which the null data frame is transmitted in order to indicate that the subchannels 1, 3, and 4 have been subject to null padding.

In response to the PPDU including the data frame, the STA transmits ACK frames to the AP at step S840. The STA may transmit the ACK frames through all the subchannels through which the PPDU is transmitted, and the ACK frames may be transmitted in a duplicated format. Furthermore, the STA may be configured to transmit the ACK frame through only the subchannel 2 through which the data frame has been actually transmitted.

The null padding includes both that a physical signal is not transmitted through a specific subchannel and that a specific meaningless physical signal is transmitted through a specific subchannel. It may be appropriate that a specific meaningless physical signal is transmitted in order to prevent a collision on channel access by taking coexistence with other systems into consideration. If a data frame is transmitted using only one subchannel, other systems may not detect access to a corresponding subchannel. This is because, in the case of a system dependent on CCA according to an energy sensing method, to transmit a physical signal to other channels in addition to a subchannel actually used to transmit a data frame may help for CCA sensing owning to an increased energy level.

In the above example, it has been assumed that a channel through which frames are actually transmitted includes continuous subchannels. Meanwhile, the channel may include a plurality of discontinuous subchannels.

Figure 9:
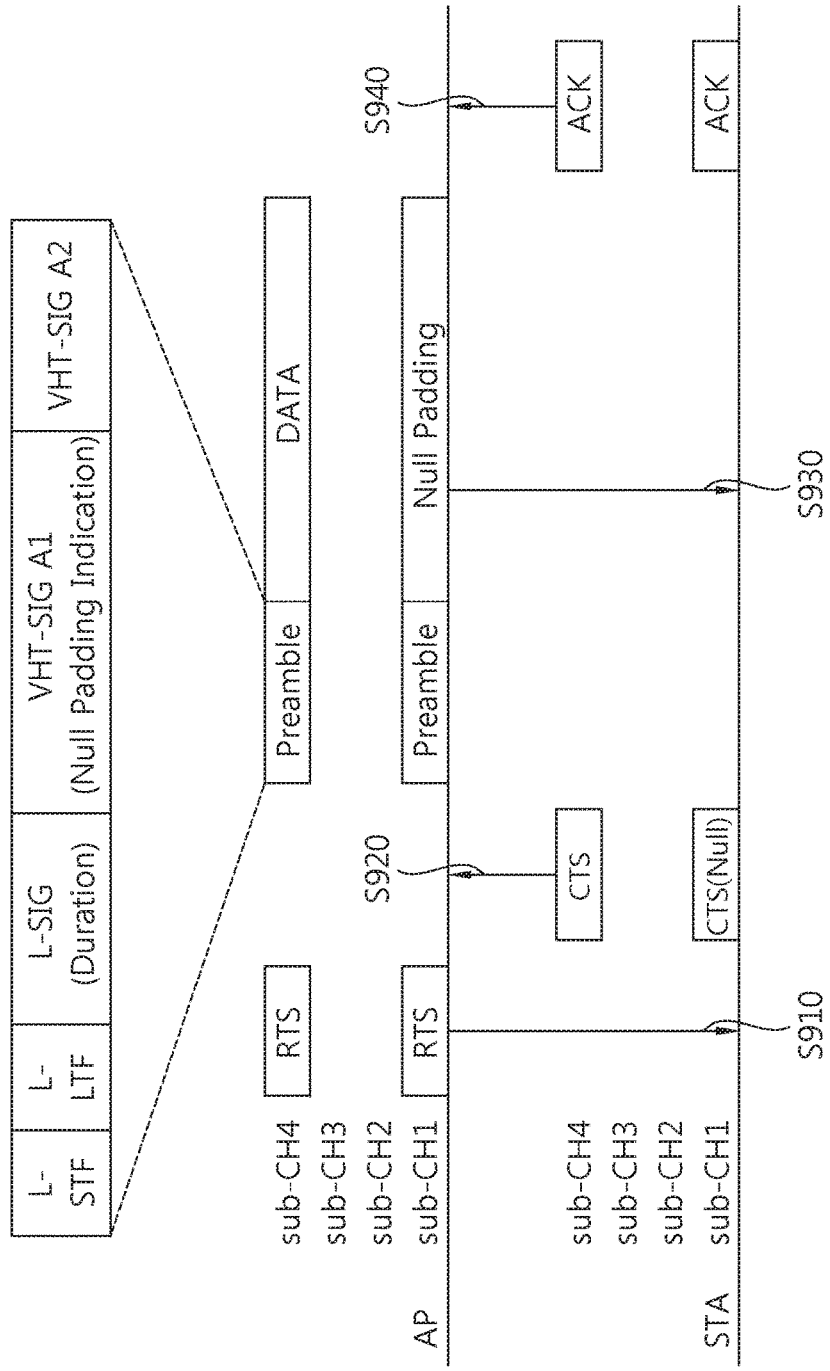
FIG. 9 is a diagram illustrating another example of a data frame transmission method based on the frequency selective channel access mechanism in accordance with an embodiment of the present invention.

FIG. 9 is a diagram illustrating another example of a data frame transmission method based on the frequency selective channel access mechanism in accordance with an embodiment of the present invention. In this example, it is assumed that an AP and an STA use a subchannel 1 and a subchannel 4, that is, discontinuous subchannels, from among subchannels 1 to 4, as transmission channels.

Referring to FIG. 9, the AP transmits RTS frames to the STA through the subchannels 1 and 4 at step S910. The RTS frames may be transmitted in a duplicated format of a discontinuous 40 MHz bandwidth.

In response to the RTS frames, the STA transmits CTS frames to the AP at step S920. Regarding the CTS frame transmitted through the subchannel 1, a null padding indication bit may be set to a value '1' so that it indicates null padding because the SNR of the subchannel 1 is low. In contrast, regarding the CTS frame transmitted through the subchannel 4, a null padding indication bit may be set to a value '0' so that it indicates the transmission of a data frame.

In response to the CTS frames, the AP transmits a PPDU, including a data frame, to the STA at step S930. The AP may transmit the data frame through the subchannel 4 whose null padding indication bit has been set to a value '0'. The PPDU transmitted by the AP may be transmitted in a duplicated format.

In response to the PPDU received from the AP, the STA transmits ACK frames to the AP at step S940. The STA may transmit the ACK frames through all the subchannels through which the PPDU is transmitted, and the ACK frames may be transmitted in a duplicated format. Furthermore, the STA may be implemented to transmit the ACK frames through only the subchannel 4 through which the data frame has been actually transmitted.

In the above example, a subchannel having the highest SNR, from among a plurality of subchannels, is illustrated as being indicated so that it is used to transmit a data frame through the subchannel probing process, but the scope of the present invention is not limited thereto. An STA may indicate that one or more subchannels are used to transmit a data frame through the subchannel probing process. When determining a subchannel for transmitting a data frame, an STA may determine a subchannel, having an SNR equal to or higher than a specific SNR threshold or higher, as a subchannel for transmitting a data frame. In this case, one or more subchannels may be indicated so that they are used to transmit a data frame.

In order to indicate that one or more subchannels are used to transmit a data frame, null padding indication bits may be set to a value '0' so that they indicate that the one or more subchannels are used to transmit the data frame regarding one or more CTS frames transmitted through corresponding subchannels.

Figure 10:
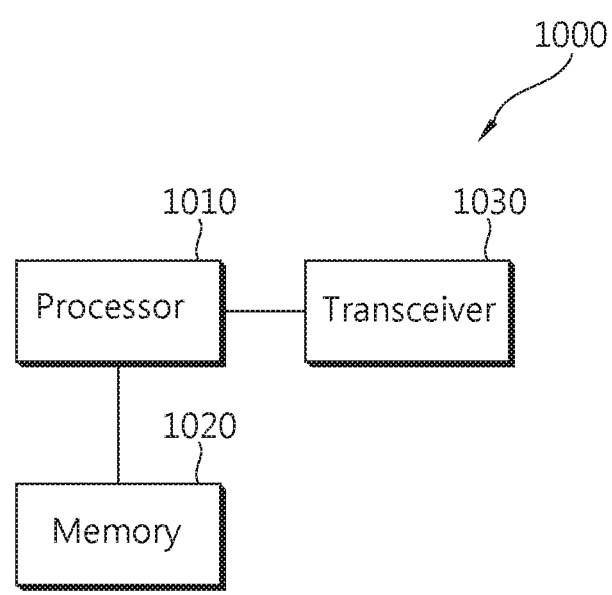
FIG. 10 is a block diagram of a wireless apparatus to which the embodiments of the present invention may be applied.

FIG. 10 is a block diagram of a wireless apparatus to which the embodiments of the present invention may be applied. The wireless apparatus may be an AP or an STA.

The wireless apparatus 1000 includes a processor 1010, memory 1020, and a transceiver 1030. The transceiver 1030 transmits and receives radio signals, and the physical layer of IEEE 802.11 is implemented in the transceiver 1030. The processor 1010 is functionally connected to the transceiver 1030 and is configured to implement the MAC layer and physical layer of IEEE 802.11. The processor 1010 is configured to implement the data frame transmission and reception method based on a channel access mechanism in accordance with an embodiment of the present invention. The processor 1010 may be configured to perform a subchannel probing procedure through an RTS-CTS exchange. The processor 1010 may be configured to determine a subchannel that will be used to transmit a data frame based on the SNR value of each subchannel. The processor 1010 may be configured to set a null padding indication bit so that it indicates a subchannel used to transmit a data frame or indicates a subchannel for null padding. The processor 1010 may be configured to transmit a data frame through a specific subchannel based on a set null padding indication bit and may perform null padding on other subchannels and transmit a PPDU. The processor 1010 may be configured to transmit ACK frames through all subchannels or a specific subchannel in response to the transmission of a PPDU. The processor 1010 may be configured to implement the embodiments of the present invention described with reference to FIGS. 6 to 9.

The processor 1010 and/or the transceiver 1030 may include Application-Specific Integrated Circuits (ASICs), other chipsets, logic circuits, and/or data processors. The memory 1020 may include Read-Only Memory (ROM), Random Access Memory (RAM), flash memory, memory cards, storage media and/or other storage devices. When the above-described embodiment is implemented in software, the above-described scheme may be implemented using a module (process or function) configured to perform the above function. The module may be stored in the memory 1020 and executed by the processor 1010. The memory 1020 may be placed inside or outside the processor 1010 and connected to the processor 1010 using a variety of well-known means.

What is claimed is:

1. A method for receiving data using a plurality of subchannels in a wireless local area network, the method comprising:
    receiving, by a receiving station, a Request To Send (RTS) frame from a transmitting station;
    transmitting, by the receiving station, a Clear To Send (CTS) frame to the transmitting station as a response to the RTS frame through at least one subchannel, the at least one subchannel being identified by the RTS frame,
    wherein the CTS frame is scrambled with a scrambling sequence initialized with a scrambler initialization value, the scrambler initialization value being determined based on a parameter of the received RTS frame;
    receiving, by the receiving station, a preamble of a Physical layer Protocol Data Unit (PPDU) from a transmitting station,
    wherein the preamble of the PPDU includes a short training field (STF), a long training field (LTF) and signal information, the signal information including bandwidth information and a channel indication, the bandwidth information indicating an entire bandwidth for all of the plurality of subchannels, the channel indication indicating which of the plurality of subchannels is used for a transmission of a data field intended to be sent to the receiving station; and
    receiving, by the receiving station, a data part of the PPDU through at least one subchannel of the plurality of subchannels, the data part of the PPDU including the data field for the receiving station.

2. The method of claim 1, wherein each subchannel includes at least one subcarrier.

3. The method of claim 2, wherein the plurality of subchannels includes different subcarriers over the bandwidth indicated by the bandwidth information.

4. The method of claim 1, wherein the signal field further includes stream information indicating a number of spatial streams allocated to the receiving station, the allocated spatial streams corresponding to the determined subchannel.

5. An apparatus receiving data using a plurality of subchannels in a wireless local area network, the apparatus comprising:
    a transceiver configured to transmit and receive radio signals; and
    a processor operably coupled to the transceiver and configured to:
        control the transceiver to receive a Request To Send (RTS) frame from a transmitting station;
        control the transceiver to transmit a Clear To Send (CTS) frame to the transmitting station as a response to the RTS frame through at least one subchannel, the at least one subchannel being identified by the RTS frame,
        wherein the CTS frame is scrambled with a scrambling sequence initialized with a scrambler initialization value, the scrambler initialization value being determined based on a parameter of the received RTS frame;
        control the transceiver to receive a preamble of a Physical layer Protocol Data Unit (PPDU) from the transmitting station,
        wherein the preamble of the PPDU includes a short training field (STF), a long training field (LTF) and information, the signal information including bandwidth information and a channel indication, the bandwidth information indicating an entire bandwidth for all of the plurality of subchannels, the channel indication indicating which of the plurality of subchannels is used for a transmission of a data field intended to be sent to the apparatus; and
        control the transceiver to receive a data part of the PPDU through at least one subchannel of the plurality of subchannels, the data part of the PPDU including the data field for the apparatus.

6. The apparatus of claim 5, wherein each subchannel includes at least one subcarrier.

7. The apparatus of claim 6, wherein the plurality of subchannels includes different subcarriers over the bandwidth indicated by the bandwidth information.

8. The apparatus of claim 5, wherein the signal field further includes stream information indicating a number of spatial streams allocated to the apparatus, the allocated spatial streams corresponding to the determined subchannel.

9. The method of claim 1, wherein the RTS frame includes bandwidth information indicating a bandwidth over which the RTS frame is transmitted.

10. The method of claim 1, wherein the transmitting station is an access point.

11. The apparatus of claim 5, wherein the RTS frame includes bandwidth information indicating a bandwidth over which the RTS frame is transmitted.

12. The apparatus of claim 5, wherein the transmitting station is an access point.

* * * * *